(12) United States Patent
Tewfik

(10) Patent No.: US 8,098,637 B1
(45) Date of Patent: Jan. 17, 2012

(54) LOAD BALANCING IN WIRELESS LOCAL AREA NETWORKS

(75) Inventor: Ahmed H. Tewfik, Edina, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 1847 days.

(21) Appl. No.: 10/812,312

(22) Filed: Mar. 29, 2004

Related U.S. Application Data

(60) Provisional application No. 60/458,273, filed on Mar. 28, 2003.

(51) Int. Cl.
H04W 4/00 (2009.01)

(52) U.S. Cl. .......................... 370/338; 370/331; 455/453

(58) Field of Classification Search .................. 370/338, 370/331; 455/453
See application file for complete search history.

(56) References Cited

U.S. PATENT DOCUMENTS

| | | | | |
|---|---|---|---|---|
| 5,600,638 | A * | 2/1997 | Bertin et al. .................. | 370/351 |
| 5,870,396 | A * | 2/1999 | Abu-Amara et al. .......... | 370/413 |
| 6,035,200 | A * | 3/2000 | Rockert ........................ | 455/453 |
| 6,332,163 | B1 * | 12/2001 | Bowman-Amuah .......... | 709/231 |
| 6,697,335 | B1 * | 2/2004 | Ergun et al. ................... | 370/238 |
| 6,704,320 | B1 * | 3/2004 | Narvaez et al. ............... | 370/408 |
| 6,765,880 | B1 * | 7/2004 | Hillard et al. ................. | 370/255 |
| 6,965,605 | B1 * | 11/2005 | Amos et al. ................... | 370/401 |
| 7,107,062 | B2 * | 9/2006 | Cruz et al. ..................... | 455/453 |
| 7,152,113 | B2 * | 12/2006 | Reynders et al. ............. | 709/238 |
| 2002/0015397 | A1 * | 2/2002 | Hughes et al. ................ | 370/338 |
| 2002/0027894 | A1 * | 3/2002 | Arrakoski et al. ............ | 370/338 |
| 2002/0071395 | A1 * | 6/2002 | Redi et al. ..................... | 370/252 |
| 2002/0137518 | A1 * | 9/2002 | Achour ......................... | 455/447 |
| 2002/0141346 | A1 * | 10/2002 | Garcia-Luna-Aceves et al. ............................ | 370/238 |
| 2003/0061363 | A1 * | 3/2003 | Bahl et al. ..................... | 709/229 |
| 2003/0068975 | A1 * | 4/2003 | Qiao et al. .................... | 455/11.1 |
| 2004/0001467 | A1 * | 1/2004 | Cromer et al. ................ | 370/338 |
| 2004/0049595 | A1 * | 3/2004 | Sun et al. ...................... | 709/238 |
| 2004/0090943 | A1 * | 5/2004 | da Costa et al. .............. | 370/338 |
| 2004/0193709 | A1 * | 9/2004 | Selvaggi et al. .............. | 709/224 |
| 2004/0246901 | A1 * | 12/2004 | Zhang et al. .................. | 370/238 |

(Continued)

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", *ASNI/IEEE Std. 802.11, 1999 Edition* (R2003), IEEE, New York, NY, (1999 Edition, Reaffirmed Jun. 12, 2003)), 528 pgs.

(Continued)

*Primary Examiner* — Lester Kincaid
*Assistant Examiner* — Diego Herrera
(74) *Attorney, Agent, or Firm* — Schwegman, Lundberg & Woessner P.A.

(57) ABSTRACT

Systems and methods perform load balancing in a wireless network. In particular, one aspect of the systems and methods is the use of weighted mean end-to-end delay across the entire WLAN that is attributable to the wireless portion of the network as a measure of network performance and user satisfaction. The weighted mean end-to-end delay, the costs of refusing service to a mobile station or forcing a mobile station to switch to another access point may be added to determine whether it is desirable to switch a station to a new access point. A further aspect of the systems and methods is the measurement of network traffic, making predictions and optimizing allocation of station to access points every T seconds, where T is selected by the network manager.

20 Claims, 3 Drawing Sheets

U.S. PATENT DOCUMENTS

| | | | |
|---|---|---|---|
| 2006/0039286 A1* | 2/2006 | Basu et al. | 370/238 |
| 2007/0064613 A1* | 3/2007 | Qian et al. | 370/238 |
| 2007/0087756 A1* | 4/2007 | Hoffberg | 455/450 |
| 2007/0118670 A1* | 5/2007 | Viswanath et al. | 709/249 |

OTHER PUBLICATIONS

Balachandran, A., et al., "Hot-Spot Congestion Relief in Public-Area Wireless Networks", *Proceedings, Fourth IEEE Workshop on Mobile Computing Systems and Applications (WMCSA '02)*, (2002), 70-80.

Bianchi, G., "Performance Analysis of the IEEE 802.11 Distributed Coordination Function", *IEEE Journal of Selected Areas in Communications*, 18(3), (Mar. 2000), 535-547.

Cali, F., et al., "IEEE 802.11 Protocol: Design and Performance Evaluation of an Adaptive Backoff Mechanism", *IEEE Journal on Selected Areas in Communications*, 18(9), (Sep. 2000), 1774-1786.

Foh, C. H., et al., "Performance Evaluation of IEEE 802.11", *IEEE 53rd Vehicular Conference (VTC Spring 2001)*, vol. 2, (2001), 841-845.

Hsiao, P.-H., "Load-Balancing Routing for Wireless Access Networks", *Proceedings, IEEE Twentieth Annual Joint Conference of the IEEE Computer and Communications Societies (INFOCOM 2001)*, vol. 2, (2001), 986-995.

Lu, S., et al., "Fair Scheduling in Wireless Packet Networks", *Proceedings of the ACM SIGCOMM '97 Conference on Applications, Technologies, Architectures, and Protocols for Computer Communication (SIGCOMM '97)*, vol. 27(4), (1997), 63-74.

Vaidya, N. H., et al., "Distributed Fair Scheduling in a Wireless LAN", *Proceedings of the 6th Annual International Conference on Mobile Computing and Networking (MobiCom '00)*, (Aug. 2000), 167-178.

Vasan, A., et al., "An Empirical Characterization of Instantaneous Throughput in 802.11b WLANs", *VASA, 2002, Technical Report CS-TR-4389, UMIACS-TR-2002-69*, http://www.cs.umd.edu/~shankar/Papers/802-11b-profile-1.pdf,(2002), 6 pgs.

Zahedi, A., et al., "Throughput of a Wireless LAN Access Point in Presence of Natural Hidden Terminals and Capture Effects", *Seventh IEEE International Symposium on Personal, Indoor and Mobile Radio Communications (PIMRC '96)*, 397-401.

* cited by examiner

LOAD BALANCING IN WIRELESS LOCAL AREA NETWORKS

RELATED FILES

This application claims the benefit of U.S. provisional patent application Ser. No. 60/458,273 entitled "LOAD BALANCING IN WIRELESS LOCAL AREA NETWORKS" and filed Mar. 28, 2003 which is hereby incorporated by reference for all purposes.

FIELD

The present invention relates generally to wireless networks in general, and more particularly to load balancing in wireless networks

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Regents of the University of Minnesota, All Rights Reserved.

BACKGROUND

Enterprise network wireless local area networks (WLANs) managers and users are reporting several challenges, including security, interference mitigation, dynamic traffic management and user management. While experts believe that security is being addressed by a number of companies and standards, the severity of the interference, dynamic traffic engineering and user management challenges is rising rapidly with the increasing number of deployed WLANs and WiFi enabled laptops, PDAs and cell phones, the convergence of WiFi and 3G/4G cellular systems and the growth in the use of the unlicensed ISM and UNI bands by non-WiFi traffic.

A unique performance issue of wireless networks is unpredictable user and application load. Since users of the network are un-tethered and nomadic by nature, they can move from cell to cell sometimes dramatically shifting the traffic loads of the various cells within the extended network. This unpredictable load can cause wide fluctuations in performance causing frustration for end-users expecting the predictability of "wired" networks.

Interference can also impact network performance. Interference can come in many forms. Interference can occur when internal elements introduce noise or interference to your environment. For example, an escalator in retail stores, a piece of machinery on a factory floor or copier in an office. This type of interference could be constant or intermittent. Regardless, this interference can have a significant impact on network capacity and performance.

Interference can also occur from external elements. For example, a neighboring enterprise or home could set up its own wireless network within the same frequency or spectrum. When this occurs, both networks are now contending for the same airspace. This overlapping interference will drive down the performance of the two networks.

The IEEE 802.11 standard uses signal strength assign mobile stations to access points. The rational behind this approach is that a strong signal indicates a good channel with a potentially high throughput. Unfortunately, the access point corresponding to the strongest channel may be overloaded and assigning a new station to it may lead to significant loss in throughput.

Another approach to WLAN performance management is balancing users across access points. This method is a simplistic way of balancing workloads in an attempt to improve performance. It assumes that users have similar bandwidth requirements and are experiencing similar channel conditions, counts users, and then allocates equal numbers across access points. What this approach does not consider is users' actual application requirements at a given point in time and the actual channel condition that it sees. A given user or application can overwhelm an access point's performance thus rendering the network inoperable for other connected users. Thus such approaches fail to consider actual network traffic and channel conditions.

In view of the above problems and issues, there is a need in the art for the present invention.

SUMMARY

The above-mentioned shortcomings, disadvantages and problems are addressed by the present invention, which will be understood by reading and studying the following specification.

Systems and methods perform load balancing in a wireless network. The goal of load balancing is to distribute traffic amongst a group of access points to accommodate more users by optimizing capacity allocation, guarantee a minimum level of user experience and maximize resource utilization in the face of dynamic traffic patterns that change with location and time. In particular, one aspect of the systems and methods is the use of weighted mean end-to-end delay across the entire WLAN that is attributable to the wireless portion of the network as a measure of network performance and user satisfaction. The weighting allows some embodiments to provide different quality of service to users and applications. The weighted mean end-to-end delay, the costs of refusing service to a mobile station or forcing a mobile station to switch to another access point may be added to determine whether it is desirable to switch a station to a new access point. A further aspect of the systems and methods is the measurement of network traffic, making predictions and optimizing allocation of station to access points every T seconds, where T is selected by the network manager.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
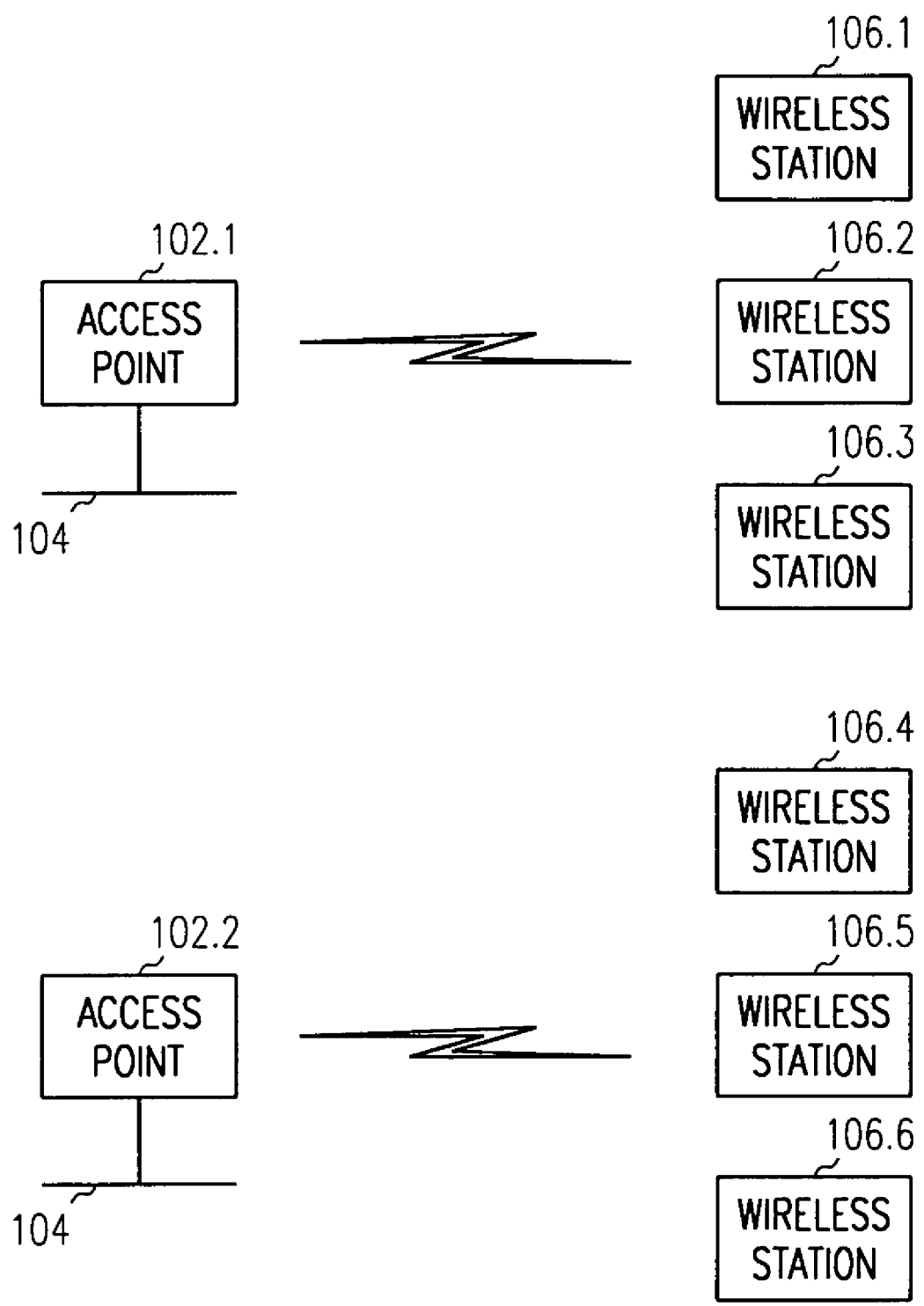
FIG. 1 is a block diagram of a wireless network operating environment in which embodiments of the invention may be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In addition, some portions of the detailed description use the term "optimal". As used in this specification, "optimal" does not necessarily mean "the best" or "the most satisfactory", rather optimal is used to mean "better than is currently available."

In the Figures, the same reference number is used throughout to refer to an identical component which appears in multiple Figures. Signals and connections may be referred to by the same reference number or label, and the actual meaning will be clear from its use in the context of the description. The following detailed description is, therefore, not to be taken in a limiting sense, and the scope of the present invention is defined only by the appended claims.

FIG. 1 illustrates a wireless network operating environment 100 in which embodiments of the invention may be practiced. In some embodiments, environment 100 includes wireless access points 102 and wireless stations 106. Wireless access points 106 may be a single function access point, or it may be integrated into a multifunction device such as a wireless access point and router, switch, hub or other network attached device. Wireless access point 104 is typically communicably coupled to a wired network 104. For example, wireless access point 102 may be communicably coupled to wired network 104 through a cable modem, DSL modem, T1 connection, or other wired connection now known in the art or developed in the future. The wireless network operating environment includes both business networking environments and home networking environments.

Wireless stations 106 comprise any type of wireless network enabled device. Examples of such devices include server computers, mainframe computers, personal computers, laptop computers, personal digital assistants (PDAs), cellular phones, and hybrids of the aforementioned devices. In addition, wireless station 106 may be a wireless network enabled home appliance such as home entertainment device (including video and audio devices), and remote control devices. No embodiment of the invention is limited to any particular wireless network enabled device.

In some embodiments of the invention, the type of wireless stations and various configuration parameters for the wireless station may be obtained using the Universal Plug and Play Protocol (UPnP).

Although FIG. 1 illustrates two access points and six wireless network stations, it should be noted that no embodiment of the invention is limited to any particular number of access points or stations.

Figure 2:
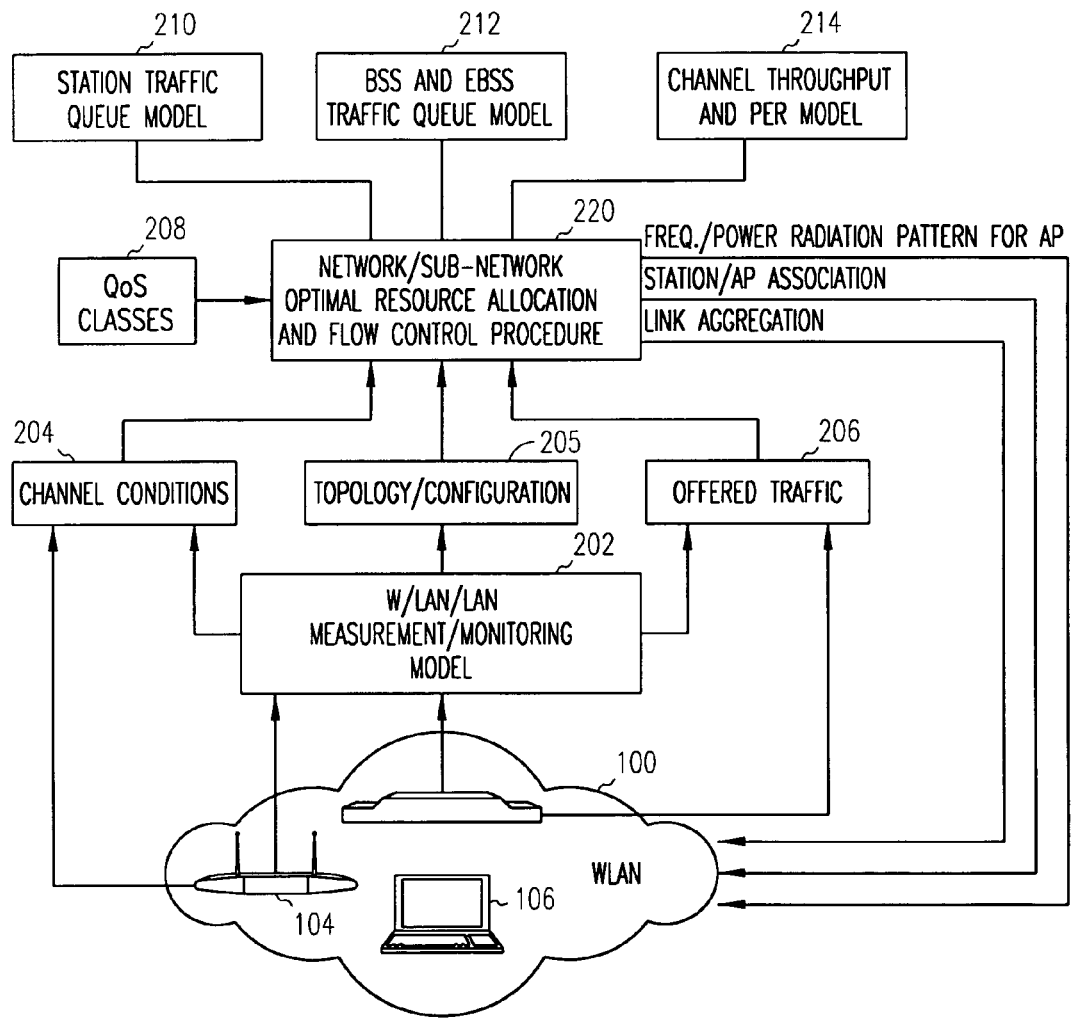
FIG. 2 is a diagram providing further details of a hardware and software environment according to an embodiments of the invention.

FIG. 2 provides further details on a hardware and software operating environment according to embodiments of the invention. In some embodiments, resource allocation and flow control module 220 operates to allocate resources among various stations and access points in a wireless network environment 100. Various forms of input may be supplied to resource allocation module 220. Such input includes channel conditions 204, network topology and configuration data 205, and offered traffic data 206. Such data may be obtained from a WLAN/LAN measurement/monitoring module 202. In addition, input data may come from QoS (Quality of Service) classes 208, station traffic queue models 210, BSS and EBSS traffic queue models 212 and channel and throughput PER model 214. Resource allocation module 220 may use this data along with the methods described below in FIG. 3 to allocate stations 106 to access points 102.

Analytical Model for End-to-End Delay and Load Balancing

It has been observed that: 1) the traffic service time of any station using a given wireless channel at any point of time depends on the number of stations that are transmitting simultaneously over that same channel at that point of time and; 2) analytic and empirical expressions for that service time are available. From these observations, embodiments of the invention use a weighted mean end-to-end delay across a WLAN to capture network performance. A statistical distribution of the number of simultaneously active stations may be identified and used to derive a close form expression for the mean end-to-end delay attributable to the WLAN.

For the purposes of this specification, assume that there are N stations 106 associated to an access point 102. Station i experiences traffic that can be modeled by Poisson arrival process with parameter $\lambda_i$. Thus the total arrival rate is given by $$\Lambda = \sum_{i=0}^{N-1} \lambda_i.$$

In some embodiments, the stations attempt to access the medium according to standard IEEE 802.11 MAC protocol.

Let $\mu_i$ be the service rate of station and be defined as follows:

$$\mu_{i/k} = \alpha_i \frac{S(k)}{t_{d_i}}$$

where $td_i$ is the mean duration of a payload transmission of station i, $\alpha_i$ models loss in throughput due to channel conditions ($\alpha_i \leq 1$, where $\alpha_i = 1$ represents ideal channel), and S(k) is the per-station saturation throughput given k active stations. An expression for S(k) used in some embodiments is S(k)=B(k)/k, where B(k) denotes the overall throughput when k stations are active. However, it should be noted that the exact form of S(k) is not critical to the various embodiments.

Furthermore, each station may be modeled as a M/M/1 queue and assume that given the number of active stations, the queues at different stations are independent. Thus, the mean end-to-end delay is given by $$\overline{T} = \left(\sum_{i=0}^{N-1} \lambda_i T_i\right) / \Lambda,$$

where $T_i$ is the total service time at station i. To provide different quality of service, $$\overline{T} = \left(\sum_{i=0}^{N-1} w_i \lambda_i T_i\right) / \Lambda$$

may be use instead, where the weights $w_i$ are used to set priorities.

An expression for $T_i$ will now be developed. Let $\pi_k$ be the probability of having k active stations. Let $p_i(n/k)$=Prob ($i^{th}$ chain is in state n/k active stations)

$$p_i(n/k) = (1 - \rho_{i/k})\rho_{i/k}^n$$

where $$\rho_{i/k} = \frac{\lambda_i}{\mu_{i/k}},$$

and $\rho_{i/0} = 0$.

The probabilities $\pi_k$ can be calculated (by summing over all possible combination with exactly k active stations) because of the independence assumption that has been made. For example, if N=2:

$$\pi_2 = (1-p_0(0/2))(1-p_1(0/2))$$

$$\pi_1 = (1-p_0(0/1))p_1(0/1) + p_0(0/1)(1-p_1(0/1))$$

$$\pi_0 = 1 - \pi_1 - \pi_2.$$

Note however that as the number of stations increases beyond 10, it generally becomes expensive to evaluate the probabilities $\pi_k$ exactly. One has then to resort either to classifying the traffic patterns into one of a few classes, e.g., heavy web traffic, light web traffic, etc., or use conditional Poisson distributions to approximate these probabilities.

Since $$E[T_{busy\ time}]E[T_{idle}]\left(\frac{1-p_0}{p_0}\right)$$

it follows that $$T_i = \frac{1}{\lambda_i}\left(\frac{1-p_i(0)}{p_i(0)}\right)$$

where $$p_i(0) = \sum_{k=0}^{N-1} \pi_k p_i(0/k) = 1 - \sum_{k=1}^{N} \pi_k \rho_{i/k}$$

Define $$\overline{\rho}_i = \lambda_i \sum_{k=1}^{N} \frac{\pi_k}{\mu_{i/k}} = \frac{\rho_i}{\alpha_i}E\left[\frac{k}{B(k)}\right] \quad (1)$$

where $$\rho_i = t_{d_i}\lambda_i,$$

$$E\left[\frac{k}{B(k)}\right] = \sum_{k=1}^{N} \pi_k \frac{k}{B(k)}. \quad (2)$$

Then $$T_i = \frac{1}{\lambda_i}\left(\frac{\overline{\rho}_i}{1 - \overline{\rho}_i}\right), \quad (3)$$

and the overall weighted mean end-to-end delay is given by:

$$\overline{T} = \frac{1}{\Lambda}\sum_{i=0}^{N-1} w_i \frac{\lambda_i}{\mu_i - \lambda_i} \quad (4)$$

Cost Function

An expression for the cost function that may be used to optimally load balance a wireless LAN will now be provided. In addition to the weighted mean end-to-end delay given by equation (4), it is desirable that in some embodiments, the cost function include penalty terms that capture delays due to network directed roaming in which a mobile station is forced to re-associate with a new access point or traffic from a new mobile station is blocked. The re-association delay is typically on the order of 100 ms to 500 ms. This delay can simply be added to the weighted mean end-to-end delay expression for each station that is directed to roam to a new access point. This delay will be denoted by $d_{re}(i)$. Blocked traffic from station i is assigned a penalty $e_i(\lambda_i)$. One class of penalty functions is specified by the following equation for the derivative $e_i'(\lambda_i)$. of the penalty with respect to $\lambda_i$ $$e'_i(\lambda_i) = -\left(\frac{a_i}{\lambda_i}\right)^{b_i}.$$

The parameters $a_i$ and $b_i$ can be used to assign priorities to the traffic of node i.

Figure 3:
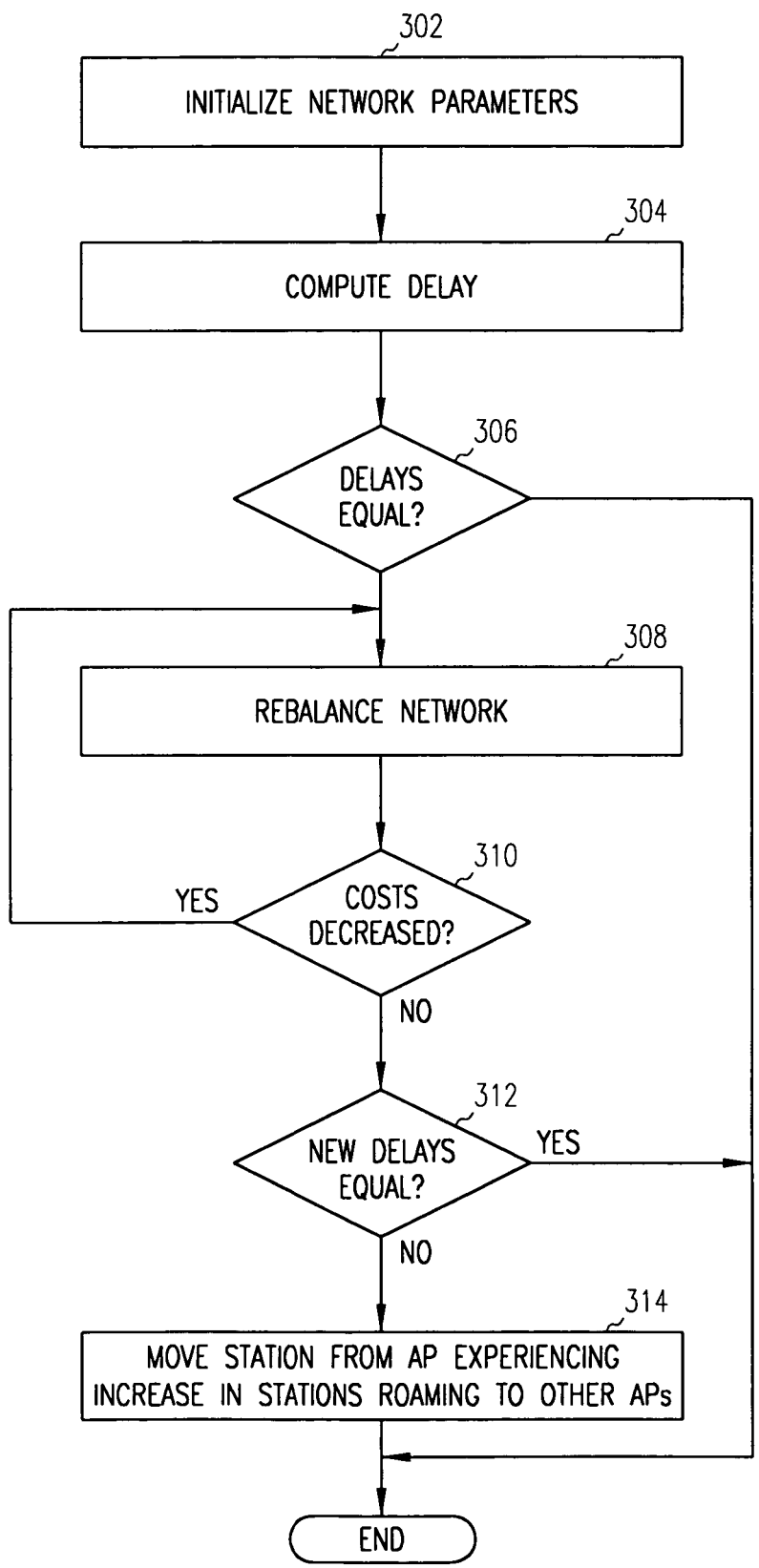
FIG. 3 is a flowchart illustrating a method for performing load balancing among stations and access points in a wireless network environment.

FIG. 3 is a flowchart illustrating methods for load balancing in wireless networks according to embodiments of the invention. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIG. 3 are inclusive of acts that may be taken by an operating environment executing an exemplary embodiment of the invention.

In some embodiments, the balancing algorithm is performed regularly every T seconds, where T is the length of an epoch and is determined by the network manager, to rebalance the network due to potential changes in traffic conditions. The optimization is typically done over a time horizon larger than T, i.e., over several epochs. This is desirable if the re-association delay is on the order of T, since otherwise the algorithm will never attempt to rebalance the network.

The balancing algorithm may also be invoked whenever one or more stations joins or leaves the network. The relative loads $\lambda_i t_{di}$ and the parameters $\alpha_i$ that capture channel condition effects at each station and for each station-AP pair may be obtained from conventional network measurements taken at the APs and feeding hubs and switches as shown in FIG. 2, and potentially traffic classification and prediction algorithms.

Note that an access point may be considered a station. In the equations below, the J access points are denoted as stations $1, 2, \ldots, J$ and the mobile stations are denoted as stations $J+1, J+2, \ldots, N$. Further, AP 0 is denoted as a dummy AP to which all blocked traffic is associated. The balancing algorithm solves the following optimization problem $$\min_{x_{ij}(k)} \frac{1}{\Lambda} \left( \sum_i w_i \lambda_i T_i(\vec{x(k)}) + \sum_i x_{i0}(k)\lambda_i e_i(\lambda_i) + \sum_i v_i \lambda_i (1 - \delta_{x_{ij}(k), x_{ij}(k-1)}) d_{re}(i) \right),$$

subject to $$x_{ij}(k) = \begin{cases} 1, & i = j, \\ 0, & i \neq j, \end{cases} \quad 1 \leq i \leq J, \qquad (5)$$

$$x_{ij}(k) = 0 \text{ or } 1, \quad J < i \leq N$$

$$\sum_j x_{ij}(k) = 1, \quad J < i \leq N.$$

In the above equations, v, and w, are weights that capture the relative priorities and importance given to traffic from station i and re-association (roaming) delays, $x_{ij}(k)=1$ means that station i is associated to access point j in epoch k (i.e., traffic splitting is not considered), $x_{i0}(k)=1$ means that station i is blocked, $\delta_{l,m}$ is a Kronecker delta function, that is $\delta_{l,m}=1$, if l=m and $\delta_{l,m}=0$ otherwise, and $T_i(\vec{x(k)})$ denotes the mean end-to-end delay experienced by station i corresponding to the association/blockings and re-association described by $\vec{x}(k)$, where $\vec{x}(k)=[x_{ij}(k)]$ is a vector denoting all associations, blockings or re-association commands.

Optimization problem (5) is a nonlinear integer optimization problem that can be solved by any one of several known approaches, such as lexicographic enumeration, pseudo-Boolean programming or generalized branch and bound.

Making the following observations can derive an alternative approach. Note first that if no traffic is blocked and there is no re-association or network directed roaming cost, the optimal association of stations to access points (APs) will balance the weighted total delay across access points. For example, if there are 3 access points and if $d_i = \Sigma_{all\ stations\ k\ associated\ to\ i} w_k \lambda_k T_k$ denotes the weighted delay experienced by all traffic $d_i=E$ associated to AP i, then the optimal solution will be characterized by $d_1 \approx d_2 \approx d_3$. Note that exact equality is not possible because of the discrete nature of the association process, i.e., all the traffic from a given station is associated to a given access point. In the presence of blocked traffic and no re-association or network directed roaming cost, the optimal solution is attained when the delays at all access points, including access point 0 whose delay is $$\sum_i x_{i0}(k)\lambda_i e_i(\lambda_i),$$

differ by approximately the cost of directing a mobile station to roam to a different access point. Again, the result is approximate because of the discrete nature of the association process.

The optimization method of various embodiments attempts to equalize the weighted delay experienced by all traffic associated to each AP across all APs, including AP 0.

The method begins with an initialization procedure (block 302). This step may not be needed when the network is operational and no new node joins the network since each AP will then have a certain number of stations associated to it.

If a new station joins the network, the method initially assigns it to the AP with lowest mean end-to-end delay that it can communicate with.

On the other hand, in the unlikely event that more than one station join the network simultaneously the method can assign them using any heuristic or by using any of the known or current load balancing techniques, such as signal strength based assignment, or assignment based on the number of stations associated to a given AP. The first approach is standard in 802.11 networks while many vendors use the second.

Next, the method re-computes the mean end-to-end delay at each AP. In some embodiments, the method uses equations (1)-(4) defined above, the cost of blocking traffic as given in equation (5), and the actual number of stations associated to each AP (block 304). Next, a check is made to determine if the delays are equal modulo the cost of directing a mobile station to roam to a different access point (block 306). If so, the procedure terminates.

Otherwise, the method next attempts to rebalance the network (block 308). In some embodiments, at the beginning of this step the method records the current value of the sum of the mean end-to-end delays in each AP. If the delays are unequal and differ by more than the cost of directing a mobile station to roam to a different access point, the method identifies the AP with the longest mean end-to-end delay. It then computes the effect of moving each station associated to that AP one at a time, keeping all other stations associated to their current APs. Each time a station is moved, the method re-computes the cost function as a result of the shift. In some embodiments, equations (1)-(4) and the cost function in (5) are used to re-compute the cost function. In particular embodiments, the system executing the method records the value of the total cost function corresponding to each new mobile station-access point association. Finally, the system selects the station-access point pair that leads to the minimum overall cost value and moves the station to that access point.

Next, at block 310, a check is made to determine if the value of the cost functions is smaller than its value at the beginning of the tasks executed at block 308. If so, the algorithm returns to block 308.

Otherwise, a check is made to determine if the mean end-to-end delays at all APs are equal or differ by less than the cost of directing a mobile station to roam to a different access point (block 312). If so, the procedure terminates.

Otherwise, after each re-assignment step, the method proceeds to block 314 and compares the old value of the cost function with its new value. If the new value is lower than the old value, the algorithm returns to block 308. Otherwise, the algorithm attempts to decrease the value of the cost function by moving a station from the AP that has experienced an increase in the number of its associated stations to other APs using the procedure described with respect to block 308. If at the end of this re-balancing step, the value of the cost function is still larger than or equal to its value at the very beginning of the preceding block 308 (prior to the first assignment done in this iteration), the procedure terminates and the algorithm undoes the two moves performed in this step and the preceding block 308.

As those of skill in the art will appreciate, the load balancing procedure described above may lead to network directed roaming, e.g., forcing stations to de-associate from an access point and re-associate with another. In some embodiments, this can be accomplished using standard 802.11 MIB functions, such as dot11DisassociateStation and dot11DeauthenticateStation issued by the access point.

Additionally, the access points themselves can be controlled via the HTTP or Telnet interfaces provided by hardware vendors.

Furthermore, the methods illustrated above may be executed by a centralized module such as resource allocation and flow control module 220, or they may be executed in a decentralized manner. For example, the Universal Plug and Play protocol or other equivalent system may be used to obtain information about the type and state of network connections, devices, services and protocols in use in the wireless network environment. Such information may be used in the load balancing methods described above. Further such information may be used to weight applications and services in the load balancing process. For example, high bandwidth uses such as video and audio streaming applications may be assigned a different weighting from lower bandwidth uses such as generalized web browsing or email applications.

CONCLUSION

Systems and methods for providing load balancing in wireless networks have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

I claim:

1. A method for load balancing a wireless network, the method comprising:
   determining a delay cost for each of a plurality of access points in the wireless network, each of said access points having zero or more wireless nodes associated with it;
   when the delay costs are not equal and when a difference in delay costs of two access points exceeds a cost to move a wireless node then:
      determining an access point with the greatest delay cost;
      for each wireless node associated with the access point with the greatest delay cost, determining an overall cost associated with moving the wireless node from the access point to each of one or more other access points of the plurality of access points; and
      moving the wireless node to the access point of the one or more other access points having a lowest overall cost associated with moving the wireless node.

2. The method of claim 1, wherein the delay cost includes an end-to-end delay.

3. The method of claim 2, wherein the delay cost includes a mean end-to-end delay at the access point.

4. The method of claim 2, wherein the delay cost includes a penalty cost for blocked traffic at the access point.

5. The method of claim 1, wherein the method for load balancing is executed at regular intervals.

6. The method of claim 1, wherein the method for load balancing is executed when a new station enters the wireless network.

7. The method of claim 1, wherein the overall cost is determined using a weighting based on the traffic for a node.

8. The method of claim 7, wherein the weighting is based on the type of traffic for the node.

9. The method of claim 1, further comprising associating blocked traffic to a dummy access point.

10. The method of claim 1, wherein moving the wireless node includes forcing the wireless node to de-associate from an access point.

11. A non-transitory computer-readable medium having computer executable instructions store thereon for causing one or more processors to execute operations for load balancing a wireless network, the operations comprising:
   determining a delay cost for each of a plurality of access points in the wireless network, each of said access points having zero or more wireless nodes associated with it; and
   when the delay costs are not equal and when a difference in delay costs of two access points exceeds a cost to move a wireless node then:
      determining an access point with the greatest delay cost,
      for each wireless node associated with the access point with the greatest delay cost, determining an overall cost associated with moving the wireless node from the access point to each of one or more other access points of the plurality of access points, and
      moving the wireless node to the access point of the one or more other access points having a lowest overall cost associated with moving the wireless node.

12. The computer-readable medium of claim 11, wherein the delay cost includes an end-to-end delay.

13. The computer-readable medium of claim 12, wherein the delay cost includes a mean end-to-end delay at the access point.

14. The computer-readable medium of claim 12, wherein the delay cost includes a penalty cost for blocked traffic at the access point.

15. The computer-readable medium of claim 11, wherein the method for load balancing is executed at regular intervals.

16. The computer-readable medium of claim 11, wherein the method for load balancing is executed when a new station enters the wireless network.

17. The computer-readable medium of claim 11, wherein the overall cost is determined using a weighting based on the traffic for a node.

18. The computer-readable medium of claim 17, wherein the weighting is based on the type of traffic for the node.

19. The computer-readable medium of claim 11, wherein the method further comprises associating blocked traffic to a dummy access point.

20. The computer-readable medium of claim 11, wherein moving the wireless node includes forcing the wireless node to de-associate from an access point.

* * * * *

UNITED STATES PATENT AND TRADEMARK OFFICE
CERTIFICATE OF CORRECTION

PATENT NO. : 8,098,637 B1
APPLICATION NO. : 10/812312
DATED : January 17, 2012
INVENTOR(S) : Ahmed H. Tewfik It is certified that error appears in the above-identified patent and that said Letters Patent is hereby corrected as shown below:

On the Title page, in field (54), in "Title", and in column 1, lines 1-2, title, delete "LOAD BALANCING IN WIRELESS LOCAL AREA NETWORKS" and insert -- USING DELAY COSTS TO LOAD BALANCE NODES ACROSS ACCESS POINTS IN WIRELESS LOCAL AREA NETWORKS --, therefor.

On the Title page, in field (56), under "Other Publications", in column 2, line 5, delete "ASNI/IEEE" and insert -- ANSI/IEEE --, therefor.

On Sheet 2 of 3, Reference Numeral 202, Figure 2, line 1, delete "W/LAN/LAN" and insert -- WLAN/LAN --, therefor.

In column 1, line 16, after "networks" insert -- . --.

In column 1, line 67, delete "rational" and insert -- rationale --, therefor.

In column 5, line 35, delete "use" and insert -- used --, therefor.

In column 6, line 5, delete "$E[T_{busy\ time}]E[T_{idle}]\left(\dfrac{1-p_0}{p_0}\right)$" and insert -- $E[T_{busy\ time}] = E[T_{idle}]\left(\dfrac{1-p_0}{p_0}\right)$ --, therefor.

Signed and Sealed this
Fourth Day of September, 2012

David J. Kappos
*Director of the United States Patent and Trademark Office*

CERTIFICATE OF CORRECTION (continued)
U.S. Pat. No. 8,098,637 B1

In column 6, line 50, delete " $T = \frac{1}{\Lambda} \sum_{i=0}^{N-1} w_i \frac{\lambda_i}{\mu_i - \lambda_i}$ " and insert -- $\bar{T} = \frac{1}{\Lambda} \sum_{i=0}^{N-1} w_i \frac{\lambda_i}{\mu_i - \lambda_i}$ --, therefor.

In column 6, line 67, delete "$e_i'(\lambda_i).$" and insert -- $e_i'(\lambda_i)$ --, therefor.